US011566113B2

(12) United States Patent
Holtgrewe et al.

(10) Patent No.: US 11,566,113 B2
(45) Date of Patent: Jan. 31, 2023

(54) CURED COMPOSITION HAVING HIGH IMPACT STRENGTH AND TEMPERATURE RESISTANCE, BASED ON AN EPOXY RESIN AND A POLYISOCYANATE

(71) Applicant: Henkel AG & Co. KGaA, Duesseldorf (DE)

(72) Inventors: Christian Holtgrewe, Duesseldorf (DE); Harald Kuester, Duesseldorf (DE); Thomas Bachon, Duesseldorf (DE); Guadalupe Sanchis Otero, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/217,697

(22) Filed: Dec. 12, 2018

(65) Prior Publication Data

US 2019/0112437 A1 Apr. 18, 2019

Related U.S. Application Data

(63) Continuation of application No. PCT/EP2017/064740, filed on Jun. 16, 2017.

(30) Foreign Application Priority Data

Jun. 20, 2016 (EP) ..................... 16175259

(51) Int. Cl.
| | |
|---|---|
| *C08J 5/04* | (2006.01) |
| *C08G 18/48* | (2006.01) |
| *C08G 18/20* | (2006.01) |
| *C08G 18/76* | (2006.01) |
| *C09J 175/04* | (2006.01) |
| *C08G 59/68* | (2006.01) |
| *C08G 18/00* | (2006.01) |
| *C08G 59/40* | (2006.01) |
| *C08G 59/62* | (2006.01) |
| *C08J 3/24* | (2006.01) |
| *B29C 67/24* | (2006.01) |
| *B29C 70/48* | (2006.01) |
| *C08G 18/09* | (2006.01) |
| *B29K 63/00* | (2006.01) |
| *B29K 79/00* | (2006.01) |

(52) U.S. Cl.
CPC .............. *C08J 5/04* (2013.01); *B29C 67/246* (2013.01); *B29C 70/48* (2013.01); *C08G 18/003* (2013.01); *C08G 18/092* (2013.01); *C08G 18/2027* (2013.01); *C08G 18/2063* (2013.01); *C08G 18/2081* (2013.01); *C08G 18/4804* (2013.01); *C08G 18/4825* (2013.01); *C08G 18/4895* (2013.01); *C08G 18/7664* (2013.01); *C08G 18/7671* (2013.01); *C08G 59/4028* (2013.01); *C08G 59/62* (2013.01); *C08G 59/686* (2013.01); *C08J 3/24* (2013.01); *C09J 175/04* (2013.01); *B29K 2063/00* (2013.01); *B29K 2079/00* (2013.01); *C08G 2115/02* (2021.01); *C08J 2363/02* (2013.01); *C08J 2375/04* (2013.01); *C08J 2375/08* (2013.01)

(58) Field of Classification Search
CPC . C08J 5/04; C08G 59/02; C08G 59/18; C08G 71/00; C08G 18/00; C08G 18/003
USPC ........................................................ 524/872
See application file for complete search history.

(56) References Cited

U.S. PATENT DOCUMENTS

| | | | | |
|---|---|---|---|---|
| 4,564,651 | A * | 1/1986 | Markert | C08G 18/003 427/116 |
| 4,762,900 | A * | 8/1988 | Velasco | C08G 18/003 528/53 |
| 4,766,158 | A | 8/1988 | Fuzesi et al. | |
| 5,036,135 | A * | 7/1991 | von Gentzkow | C08G 18/003 524/786 |
| 5,206,287 | A | 4/1993 | Mueller | |
| 5,274,012 | A * | 12/1993 | Neffgen | C08G 18/711 523/415 |
| 5,304,612 | A * | 4/1994 | Umetani | C08G 18/003 525/452 |
| 10,689,476 | B2* | 6/2020 | Holtgrewe | C08G 18/7621 |
| 2011/0160327 | A1* | 6/2011 | Occhielio | C08G 18/092 521/156 |
| 2016/0002496 | A1 | 1/2016 | Aou et al. | |
| 2016/0122582 | A1* | 5/2016 | Aou | C08G 18/10 427/385.5 |
| 2017/0283543 | A1* | 10/2017 | Holtgrewe | C08G 18/4825 |

(Continued)

FOREIGN PATENT DOCUMENTS

| | | |
|---|---|---|
| EP | 0482331 A1 | 4/1992 |
| JP | S5174095 A | 6/1976 |

(Continued)

OTHER PUBLICATIONS

International Search Report for International PCT Patent Application No. PCT/EP2017/064740 dated Sep. 19, 2017.

(Continued)

*Primary Examiner* — Jane L Stanley
(74) *Attorney, Agent, or Firm* — James E Piotrowski

(57) ABSTRACT

The invention relates to a method for producing a cured composition which has at least one oxazolidinone ring and at least one isocyanurate ring and is cross-linked by the same, starting from a liquid reactive mixture which, based on the total weight thereof, contains at least one epoxy resin, at least one polyisocyanate, at least one polyol, and at least one catalyst composition. The invention further relates to the cured composition obtainable thereby.

18 Claims, No Drawings

(56) References Cited

U.S. PATENT DOCUMENTS

| | | | |
|---|---|---|---|
| 2022/0153905 A1* | 5/2022 | Sodano | C08G 18/022 |
| 2022/0204684 A1* | 6/2022 | Frick-Delaittre | C08G 18/3218 |
| 2022/0227919 A1* | 7/2022 | Frick-Delaittre | C08G 18/7671 |

FOREIGN PATENT DOCUMENTS

| | | |
|---|---|---|
| JP | S61181816 A | 8/1986 |
| JP | S6445422 A | 2/1989 |
| JP | H05214061 A | 8/1993 |

OTHER PUBLICATIONS

DIN ISO 2555.
DIN EN 2564:1998-08.
DIN EN ISO 1172:1998-12.
EN-ISO 527.
EN-ISO 178.
IOS 13586.

\* cited by examiner

CURED COMPOSITION HAVING HIGH IMPACT STRENGTH AND TEMPERATURE RESISTANCE, BASED ON AN EPOXY RESIN AND A POLYISOCYANATE

The present invention relates to a method for preparing a cured composition which comprises at least one oxazolidinone ring and at least one isocyanurate ring and is crosslinked thereby, starting from a liquid reaction mixture which contains, based on the total weight thereof, at least one epoxy resin, at least one polyisocyanate, at least one polyol and at least one catalyst composition, and to the cured composition obtained by said method.

Cured polymer compositions are exposed to high mechanical and thermal stress during the production and application thereof. In order to increase the impact toughness of the polymer compositions, tougheners are added to the resin systems from which the compositions are made. The tougheners known in the prior art cause an increase in impact toughness but also a reduction in the glass transition temperature, and therefore they are unsuitable for use at an elevated temperature.

Moreover, commercially available polymer compositions which have high glass transition temperatures are disadvantageous due to low storage stability and long curing cycles. Other possible resin systems are often solid or highly viscous, such that they cannot be used in the frequently used resin transfer molding (RTM) methods, which require liquid resin systems.

The present invention is based on the finding of the inventor that, by adding polyols to polyepoxy or polyisocyanate monomers that are stable at room temperature and have a low viscosity in particular ratios and in short curing cycles, oxazolidinone-crosslinked and isocyanurate-crosslinked plastics materials can be produced and the impact toughness is increased without reducing the glass transition temperature in the process. The plastics materials can thus be used in manufacturing methods and for the subsequent applications thereof in which they are exposed to high temperatures. The plastics materials thus obtained demonstrate additional advantageous mechanical properties, in particular high impact toughness, which are suitable for use in automobile manufacture. In addition, the performance and properties of the polymers thus obtained may be varied over a wide range by controlling the curing conditions and type of catalyst systems. Finally, systems of this kind are also advantageous in that they remain stable at room temperature and therefore do not need to be stored in a cooled state.

It has now surprisingly been found that reaction mixtures which comprise, based on the total weight thereof, at least one liquid, aromatic epoxy resin, at least one liquid, aromatic polyisocyanate, 1 to 20 wt. % of at least one polyol and at least one suitable catalyst composition, there being an excess of NCO groups in comparison with the epoxide groups, during curing produce oxazolidinone-crosslinked and isocyanurate-crosslinked polymer compositions which have increased mechanical stability and therefore are particularly suitable for producing fiber-reinforced plastics molded articles, such as automobile parts. Owing to the use of 1 to 20 wt. % of at least one polyol based on the total weight of the reaction mixture, the impact toughness of the cured polymer composition obtained increases without reducing the glass transition temperature. This phenomenon is surprisingly accentuated by the use of a molar excess of NCO groups in comparison with epoxide groups.

In a first aspect, the present invention therefore relates to a method for preparing a cured polymer composition which comprises at least one oxazolidinone ring and at least one isocyanurate ring, the method comprising the steps of:

(1) providing a liquid reaction mixture comprising, based on the total weight thereof:
   (a) 9.0 to 82.5 wt. % of at least one liquid, aromatic epoxy resin;
   (b) 16.5 to 90.0 wt. % of at least one liquid, aromatic polyisocyanate;
   (c) 1.0 to 20.0 wt. % of at least one polyol; and
   (d) 0.01 to 10.0 wt. % of at least one catalyst composition, the at least one epoxy resin, based on the at least one polyisocyanate, being used in such amounts that the molar equivalent ratio of isocyanate groups to epoxide groups is greater than 1.2, preferably between 1.2 and 10, more preferably between 1.25 and 5, even more preferably between 1.3 and 4 and most preferably between 1.4 and 2; and (2) curing the reaction mixture in order to obtain a cured polymer composition which comprises at least one oxazolidinone ring and at least one isocyanurate ring.

In another aspect, the present invention relates to a fiber-reinforced, cured composition which can be obtained by the method described herein.

"At least one," as used herein, refers to 1 or more, for example 1, 2, 3, 4, 5, 6, 7, 8, 9 or more. In connection with components of the catalyst compositions described herein, this information does not refer to the absolute amount of molecules, but to the type of the component. "At least one polyol" therefore signifies, for example, one or more different polyols, which is to say one or more different types of polyols. Together with stated amounts, the stated amounts refer to the total amount of the correspondingly designated type of component, as defined above.

"Liquid", as used herein, denoted compositions that are flowable at room temperature (20° C.) and normal pressure (1013 mbar).

The viscosity of the liquid composition described herein is in particular low enough for the composition to be pumpable and to be able to wet and impregnate fiber materials, for example, as used for fiber-reinforced plastics parts. In various embodiments, the reaction mixture has a viscosity of <100 mPas at a temperature of 80° C. In order to determine the viscosity, the resin mixture is prepared at room temperature using a suitable mixer and the viscosity is determined with increasing temperature at a heating speed of 50 K/min on a plate/plate rheometer in oscillation.

The epoxy resin may comprise epoxide group-containing monomers, prepolymers and polymers as well as mixtures thereof, and is also referred to in the following as epoxide or epoxide group-containing resin. Suitable epoxide group-containing resins are in particular resins having 1 to 10, preferably 2 to 10 epoxide groups per molecule. "Epoxide groups" as used herein refers to 1,2-epoxide groups (oxiranes).

The epoxy resins usable herein may vary and include conventional and commercially available epoxy resins, each of which may be used individually or in combination of two or more different epoxy resins. In selecting the epoxy resins, not only the properties of the final product but also the properties of the epoxy resin such as the viscosity and other properties that affect processability are important.

The epoxide group-containing resin is a liquid, aromatic epoxy compound. Examples of suitable resins include, without being limited thereto, (poly)glycidyl ethers, which are usually obtained by reacting epichlorohydrin or epibromohydrin with polyphenols in the presence of alkali, or also (poly)glycidyl ethers of phenol formaldehyde novolac resins, alkyl-substituted phenol formaldehyde resins (epoxy novolac resins), phenol-hydroxybenzaldehyde resins, cresol-hydroxybenzaldehyde resins, dicyclopentadiene phenol resins and dicyclopentadiene-substituted phenol resins. Suitable polyphenols for this purpose are, for example, resorcinol, pyrocatechol, hydroquinone, bisphenol A (2,2-bis(4-hydroxyphenyl) propane), bisphenol F (bis(4-hydroxyphenyl) methane), 1,1-bis(4-hydroxyphenyl) isobutane, 4,4-dihydroxybenzophenone, 1,1-bis(4-hydroxyphenyl) ethane and 1,5-hydroxynaphthalene. Also suitable are diglycidyl ethers of ethoxylated resorcinol (DGER), diglycidyl ether of resorcinol, pyrocatechol, hydroquinone, bisphenol, bisphenol A, bisphenol AP (1,1-bis (4-hydroxyphenyl)-1-phenylethane), bisphenol F, bisphenol K, bisphenol S, and tetramethyl bisphenol.

Other suitable epoxy resins are known in the prior art and can be found, for example, in Lee H. & Neville, K., Handbook of Epoxy Resins, McGraw-Hill Book Company, 1982 reprint.

Particularly preferred epoxide group-containing compounds are aromatic glycidyl ethers, in particular diglycidyl ethers, most particularly preferably those based on aromatic glycidyl ether monomers. Examples thereof are, without limitation, di- or polyglycidyl ethers of polyhydric phenols, which can be obtained by reacting a polyhydric phenol with an excess of chlorohydrin such as epichlorohydrin. Polyhydric phenols of this kind include resorcinol, bis(4-hydroxyphenyl)methane (bisphenol F), 2,2-bis(4-hydroxyphenyl) propane (bisphenol A), 2,2-bis(4'-hydroxy-3',5'-dibromophenyl)propane, 1,1,2,2-tetrakis(4'-hydroxyphenyl) ethane or condensates of phenols with formaldehyde, which are obtained under acidic conditions, such as phenol novolacs and cresol novolacs.

Diglycidyl ethers of bisphenol A are available for example as DER 331 (liquid bisphenol A epoxy resin) and DER 332 (diglycidyl ether of bisphenol A) from Dow Chemical Company, Midland, Mich. Although not specifically mentioned, other epoxy resins which are available under the trade names DER and DEN from Dow Chemical Company may also be used.

The polyisocyanate contains two or more isocyanate groups and includes every known isocyanate that is suitable for the purpose according to the invention, and is sometimes referred to in the following as isocyanate or isocyanate group-containing resin.

Isocyanates having two or more isocyanate groups are suitable as polyisocyanates in the polyisocyanate components. The polyisocyanates preferably contain 2 to 10, more preferably 2 to 5, even more preferably 2 to 4 and in particular exactly 2 isocyanate groups per molecule. The use of isocyanates having a functionality of more than two can be advantageous in some circumstances since polyisocyanates of this kind are suitable as crosslinkers.

An aromatic polyisocyanate is used as the at least one polyisocyanate of the polyisocyanate component. In an aromatic polyisocyanate, the NCO groups are bonded to aromatic carbon atoms. Examples of suitable aromatic polyisocyanates are 1,5-naphthylene diisocyanate, 2,4'-, 2,2'- or 4,4'-diphenylmethane diisocyanate (MDI), xylylene diisocyanate (XDI), m- and p-tetramethylxylylene diisocyanate (TMXDI), 2,4- or 2,6-toluylene diisocyanate (TDI), di- and tetraalkyldiphenyl methane diisocyanate, 3,3'-dimethyldiphenyl-4,4'-diisocyanate (TODI) 1,3-phenylene diisocyanate, 1,4-phenylene diisocyanate and 4,4'-dibenzyl diisocyanate.

The polyisocyanate component may also contain proportions of low-molecular-weight prepolymers, for example reaction products of MDI or TDI having low-molecular-weight diols or triols such as ethylene glycol, diethylene glycol, propylene glycol, dipropylene glycol, triethylene glycol, glycerol or trimethylolpropane. These prepolymers can be prepared by reacting an excess of monomeric polyisocyanate in the presence of diols or triols. In this case, the number-average molecular weight of the diols and triols is generally below 1000 g/mol. The reaction product may optionally be liberated from monomeric aromatic isocyanates by distillation.

The at least one polyisocyanate preferably has an NCO content of more than 25 wt. %, more preferably more than 28 wt. %, particularly preferably more than 30 wt. %, more particularly preferably from 30 to 50 wt. %, based on the at least one polyisocyanate. When using only one polyisocyanate, the mass proportion refers to the amount of this polyisocyanate that is used; in contrast, when using a mixture of polyisocyanates, it refers to the amount of the mixture of these polyisocyanates that is used.

The at least one polyisocyanate preferably has a viscosity of less than 80 mPas, in particular from 30 to 60 mPas (DIN ISO 2555, Brookfield viscometer RVT, spindle no. 3, 25° C.; 50 rpm).

It is particularly preferable for the at least one polyisocyanate to have a number-average molecular weight of less than 1500 g/mol, more preferably less than 1000 g/mol.

Particularly suitable isocyanate group-containing resins are methylene diphenyl diisocyanate (MDI), toluol-2,4-diisocyanate (TDI), polymeric diphenylmethane diisocyanate (PMDI) and mixtures thereof. These polyisocyanates are commercially available for example under the trade name Desmodur® from Bayer AG (DE).

Particularly preferred are aromatic polyisocyanate monomers, in particular aromatic diisocyanates such as MDI and TDI.

It is generally preferable for both the epoxides used and the isocyanates used to be monomers, in particular monomers that are liquid and of low viscosity under standard conditions (20° C., 1013 mbar). These are therefore in particular advantageous because they are significantly more stable, in particular more storage-stable in comparison with other, higher-functional epoxy resins, and do not need to be stored in a cooled state.

In various embodiments of the invention, the reaction mixture may contain a plurality of different epoxide group-containing compounds and/or a plurality of different isocyanate group-containing compounds.

The liquid reaction mixture further comprises at least one polyol. "Polyols", as used herein, refers to compounds which have at least 2 hydroxyl groups (—OH) per molecule. For example, the at least one polyol can have 2 or more hydroxyl groups, i.e. 3, 4, 5, 6, 7, 8, 9, 10, or more, and can have a cyclic, linear or branched structure. The at least one polyol particularly preferably has on average 2 to 10, in particular 2 to 6, preferably 2 to 3 hydroxyl groups. Diols and/or triols are particularly preferred. The polyols according to the invention may all be polyols that are known in the prior art and are suitable according to the invention. In various embodiments, the polyol may have a number-average molecular weight of from 120 to 6000 g/mol, for example from 120 to 6000 g/mol, from 120 to 4000 g/mol, from 120 to 2000 g/mol, from 120 g/mol to 1000 g/mol, from 500 g/mol to 6000 g/mol, from 500 g/mol to 4000 g/mol, from 500 g/mol to 2000 g/mol, from 500 g/mol to 1000 g/mol, from 1000 g/mol to 6000 g/mol, from 1000 g/mol to 4000 g/mol, from 1000 g/mol to 2000 g/mol or of 2000 g/mol.

In a preferred embodiment, the at least one polyol is a polyether polyol, a polyester polyol or mixtures thereof. The polyether polyol may therefore be a polyoxyalkylene polyol. The at least one polyol may also be a glycol. Glycols are compounds that can be derived from diols, for example by reacting at least two diols with elimination of water and formation of at least one ether group. "Diols", as used herein, are compounds which have two alcohol groups. In this case, the alcohol groups may be vicinally, i.e. adjacently, or non-vicinally arranged. Diols according to the invention may be, without being limited thereto, ethylene diol, propylene diol, butylene diol, pentylene diol, hexylene diol, heptene diol and octylene diol. The glycols may be derived from a diol or from mixtures of different diols. The polyol according to the invention is preferably selected from the group consisting of polyethylene glycol, polypropylene glycol, polytetramethylene glycol, polyhexamethylene glycol and mixtures thereof. The polyol is particularly preferably selected from the group consisting of polyethylene glycol, polypropylene glycol or mixtures thereof and the polyol is more preferably propylene glycol. The propylene glycol can have a number-average molecular weight of from 120 to 6000 g/mol. The propylene glycol according to the invention preferably has a number-average molecular weight of from 120 to 6000 g/mol, more preferably 1000 to 3000 g/mol and most preferably of 2000 g/mol.

Unless indicated otherwise, the molecular weights indicated in the present text refer to the number average of the molecular weight ($M_n$). The number average molecular weight can be determined by gel permeation chromatography according to DIN 55672-1:2007-08 with THF as the eluent. Except where indicated otherwise, all molecular weights indicated are those that have been determined by means of GPC.

As described above, the polyol according to the invention may also be a polyol having more than two alcohol groups. Examples of polyols of this kind include, without being limited thereto, glycerol, sorbitol, mannitol, xylitol, maltitol, lactitol, erythritol, isomalt, ribitol, galactitol, iditol, arabitol and polyglycitol.

The weight proportion of the at least one polyol can be varied from 1.0 to 20.0 wt. % based on the reaction mixture and depends on the at least one polyol and the chemical and physical properties thereof and on the desired physical and chemical properties of the cured composition. In a preferred embodiment, the liquid reaction mixture contains 2.0 to 15.0 wt. %, preferably 4.0 to 12.0 wt. % polyol. By using said polyols in said weight ranges, the polymer compositions according to the invention have an increased mechanical stability, in particular an increased impact toughness, without lowering the glass transition temperature, and therefore the compositions obtained can be exposed to elevated temperatures during manufacture and its intended use. Said polyols are therefore particularly suitable for the production of fiber-reinforced plastics shaped parts, such as automobile parts.

The weight ratio of the at least one polyisocyanate and the at least one epoxy resin can likewise be varied and depends on the compounds used in each case and the chemical and physical properties thereof and on the desired physical and chemical properties of the cured composition. The polyisocyanate and the epoxy group are generally used in such amounts that the molar equivalent ratio of isocyanate groups to epoxide groups is at least 1.2, in particular at least 1.25, preferably at least 1.3, more preferably at least 1.4, particularly preferably at least 1.5. The molar equivalent ratio of isocyanate groups to epoxide groups is preferably at most 10, in particular at most 5, more preferably at most 3, particularly preferably at most 2. "Molar equivalent ratio" here refers to the molar ratio between epoxide groups and isocyanate groups. The molar equivalent ratio is formed in this case as a quotient of isocyanate groups to epoxide groups, twice as many isocyanate groups with respect to epoxide groups corresponding to a molar equivalent ratio of 2. A molar equivalent ratio of at least 1.2 therefore means, for example, that there are at least 1.2 mol of isocyanate groups for 1 mol of epoxide groups. This means that the isocyanate groups are present in a molar excess with respect to the epoxide groups. The molar equivalent ratio of isocyanate groups to epoxide groups is preferably between 1.2 and 10, more preferably between 1.2 and 5, even more preferably between 1.25 and 5, most preferably between 1.3 and 2. The inventors have discovered that using such amount ratios results in particularly advantageous properties with respect to the glass transition temperature, the modulus of elasticity and the impact toughness.

In various embodiments of the invention, based on the total weight of the reaction mixture, 9.0 to 82.5 wt. %, preferably 15.0 to 65.0 wt. %, more preferably 20.0 to 60.0 wt. %, most preferably 30.0 to 50.0 wt. % of at least one liquid, aromatic epoxy resin is used. In various embodiments of the invention, based on the total weight of the reaction mixture, 16.5 to 90.0 wt. %, preferably 20.0 to 80.0 wt. %, more preferably 30.0 to 75.0 wt. %, most preferably 35.0 to 70.0 wt. % of the at least one liquid, aromatic polyisocyanate is used.

The reaction mixture comprises a catalyst composition as an additional component. In various embodiments, the catalyst composition does not comprise curing agents, i.e. compounds which enter into an epoxide-polyaddition reaction, for example dicyandiamide, DDS (diaminodiphenyl sulfone) and similar compounds, but only comprises compounds which catalyze the polymerization of the polyisocyanate and epoxide. In preferred embodiments, the reaction mixture is therefore free of dicyandiamide or DDS, preferably entirely free of curing agents such as dicyandiamide or DDS.

"Free of", as used in this context, means that the amount of the corresponding substance in the reaction mixture is less than 0.05 wt. %, preferably less than 0.01 wt. %, more preferably less than 0.001 wt. %, based on the total weight of the reaction mixture.

The catalyst composition may contain one or more catalysts. In various embodiments, said composition is suitable for forming oxazolidinone and isocyanurate rings from the indicated components.

In a preferred embodiment, the catalyst is a base, the base used as the catalyst preferably being a non-ionic, nitrogen-containing base which comprises at least one tertiary nitrogen atom and/or an imine nitrogen atom, in particular being an imidazole or imidazolidine. It is further preferred for the catalyst or the base not to be based on an imidazolium cation.

The term "tertiary", as used herein, indicates that three organic functional groups are covalently bonded by means of single bonds to the nitrogen atom that is contained in the at least one base. Alternatively, the at least one base may contain an imine nitrogen atom. The term "imine", as used herein, refers to the known substance class and indicates that the nitrogen atom has a covalent double bond to an organic functional group and a covalent single bond to another organic functional group. Imines are Schiff's bases. The bases are preferably unblocked bases. That means that the bases are used in pure or untreated or unreacted form, and not in the form of a salt or, for example, in a phenol-blocked form. By means of blocking, the effect of the catalyst and thus the reaction speed and the resulting properties are negatively affected.

The catalyst composition can, in various embodiments, contain a plurality of the above-described non-ionic bases, for example a base comprising an imine nitrogen and a base comprising a tertiary nitrogen atom. The non-ionic base can also be both a tertiary amine and an imine by containing both a tertiary nitrogen atom and an imine nitrogen.

The base used is preferably a non-ionic, nitrogen-containing base which comprises at least one tertiary nitrogen atom and/or an imine nitrogen atom and also has a cyclic structure.

In various embodiments, the at least one non-ionic base is a tertiary amine of formula (I) $NR_1R_2R_3$ and/or an imine of formula (II) $N(=R_4)R_5$.

The $R_1$ to $R_3$ and $R_5$ functional groups are each selected independently of one another from the group consisting of substituted or unsubstituted, linear or branched alkyl having 1 to 20 carbon atoms, substituted or unsubstituted, linear or branched alkenyl having 3 to 20 carbon atoms and substituted or unsubstituted aryl having 5 to 20 carbon atoms, or at least two of $R_1$ to $R_3$ form, together with the nitrogen atom to which they are bonded, a 5- to 10-membered heteroalicyclic ring or heteroaryl ring, which optionally contains one or more additional nitrogen atoms, in particular 1 additional nitrogen atom. At least two of $R_1$ to $R_3$ form, together with the nitrogen atom to which they are bonded, a 5- to 10-membered heteroalicyclic ring or heteroaryl ring, which optionally contains one or more additional nitrogen atoms, in particular 1 additional nitrogen atom.

$R_4$ is a substituted or unsubstituted, linear or branched alkylenyl having 3 to 20 carbon atoms or $R_4$ and $R_5$ form, together with the nitrogen atom to which they are bonded, a 5- to 10-membered heteroalicyclic ring or heteroaryl ring, which optionally contains additional nitrogen atoms. $R_4$ and $R_5$ preferably form, together with the nitrogen atom to which they are bonded, a 5- to 10-membered heteroalicyclic ring or heteroaryl ring, which optionally contains additional nitrogen atoms.

"Alkenyl", as used herein, refers to an alkyl functional group which is bonded to the nitrogen atom by a double bond. If substituted, the substituents are defined as described above for alkyl functional groups.

In various embodiments of the invention, the tertiary amine bases or the imine bases are cyclic compounds which preferably contain at least two nitrogen atoms, i.e. at least two of the $R_1$ to $R_5$ functional groups combine in order to form, together with the nitrogen atom to which they are bonded, a ring, and further contain an additional nitrogen atom in the form of an —NRR' functional group, the nitrogen atom being a ring atom and the R or R' functional group being part of the ring formation. Bases based on imidazole or imidazolidine are particularly preferred. In various embodiments, the bases are therefore for example imidazole derivatives such as 1-alkyl-imidazole or 2,4-dialkylimidazole.

In various embodiments, the at least one non-ionic base is selected from the group consisting of 1-methylimidazole, 2,4-ethylmethylimidazole (EMI), 4-dimethylaminopyridine, 1,4-diazabicyclo[2.2.2]octane (DABCO), 1,8-diazabicyclo[5.4.0]undec-7-ene (DBU), 1,5-diazabicyclo[3.4.0]non-5-ene (DBN) and mixtures thereof. The base is preferably selected from the group consisting of EMI, DBU and mixtures thereof.

In a preferred embodiment, at least two bases from the described bases, in particular exactly two, are contained. By using two different bases, the reaction can be accelerated or the reaction speed can be controlled and monitored in a targeted manner. In addition, the use of two different bases can have an advantageous effect on the resulting properties.

In a further preferred embodiment, exactly one base, from the described bases, is contained.

In a preferred embodiment, based on the total amount, 0.01 to 10 wt. %, preferably 0.1 to 5 wt. %, preferably 0.1 to 2 wt. % of the catalyst composition (d), or preferably of the mentioned at least one base, is used.

"Providing", as used herein, refers to mixing the components of the reaction mixture in any sequence. It can be advantageous, for example, first to combine two or more components and optionally mix to form a heterogeneous or homogeneous mixture before the remaining components are added. In this way, for example, first the at least one epoxide group-containing compound and the catalyst composition can be combined and mixed and then, for example just before the curing process, the at least one isocyanate group-containing compound can be added and mixed into the other already intermixed components. Between the various combining and mixing steps, it can be advantageous to cool the reaction mixture to room temperature.

In general, the individual components of the reaction mixture can be used per se or as a solution in a solvent, for example an organic solvent or a mixture of organic solvents. For this purpose, every known solvent that is suitable for the purpose according to the invention can be used. The solvent can be a high-boiling organic solvent, for example. The solvent can be selected from the group consisting of petroleum, benzene, toluene, xylene, ethyl benzene and mixtures thereof. Since the epoxide and isocyanate compounds are preferably selected from liquid, low-viscosity monomers, in various embodiments the catalyst composition can be used as a solution, as described above.

In various embodiments, the reaction mixture comprises, in addition to the epoxide (a), the isocyanate (b), the polyol (c) and the catalyst composition (d), additional components as are already known per se and conventional in the prior art.

For example, as an additional component, a modified resin can be used which gives the compositions obtainable after the curing process improved impact strength and low temperature properties. Modified epoxide group-containing resins of this type are known in the prior art and comprise reaction products of epoxy resins having an epoxide functionality of more than 1 having carboxy functional rubbers, dimer fatty acids or what are known as core-shell polymers, the cores of which have a glass transition temperature of less than −30° C. In this case, the epoxide group-containing resin is preferably used in a stoichiometric excess and produces an epoxy functional reaction product. The excess of epoxide group-containing resin can also be far above the stoichiometric excess. An epoxide functionality of more than 1 means that the compounds contain more than 1, preferably at least 2, 1,2 epoxide groups per molecule. Those modified epoxide group-containing resins that have an epoxy equivalent weight of between 150 and 4000 are advantageous. Epoxide group-containing resins can also be modified in particular with a copolymer of a 1,3-diene or an ethylenically unsaturated comonomer and/or by core-shell particles (CSR core-shell rubber). These modified resins are used in addition to the epoxy resin (a) and the isocyanate (b).

In addition to those mentioned above, as well as the at least one polyol, additional tougheners, for example liquid rubbers, can be used.

The reaction mixture described herein can be combined with other components, for example the tougheners described above, in the form of an adhesive composition or an injection resin.

Adhesive compositions or injection resins of this kind can contain many other components, all of which are known to a person skilled in the art, including, but not limited to, frequently used auxiliaries and additives, for example fillers, softeners, reactive and/or nonreactive diluents, mobile solvents, coupling agents (e.g. silanes), adhesion promoters, wetting agents, release agents, flame retardants, wetting agents, thixotropic agents and/or rheological auxiliaries (e.g. pyrogenic silicic acid), ageing and/or corrosion inhibitors, stabilizers and/or dyes. Depending on the requirements of the adhesive or the injection resin and the application thereof and in respect of the production, flexibility, strength and adhesion to substrates, the auxiliaries and additives are worked into the composition in different amounts.

In various embodiments of the invention, depending on the desired use, the reaction mixture is applied to a substrate, for example when using as an adhesive, or filled into a die, when using as a molding material for producing plastics parts. In preferred embodiments, the method is a transfer molding (RTM) method and the reaction mixture is a reactive injection resin. "Reactive", as used in this context, refers to the fact that the injection resin is chemically crosslinkable. In the RTM method, providing the reaction mixture, i.e. step (1) of the described method, can include filling, in particular injecting the injection resin into a die. In the production of fiber-reinforced plastics parts, for which the described method and reaction mixtures are particularly suitable, fibers or semi-finished fiber products (for example, prewoven fiber products and/or fiber preform products) can be laid in the mold before injection into said mold. Materials known in the prior art for this application, in particular carbon fibers, can be used as the fibers and/or semi-finished fiber products.

The invention further relates to the reaction mixtures described in relation to the method, i.e. resin compositions which contain, based on their total weight: (a) 9.0 to 82.5 wt. % of at least one liquid, aromatic epoxy resin; (b) 16.5 to 90.0 wt. % of at least one liquid, aromatic polyisocyanate; (c) 1.0 to 20.0 wt. % of at least one polyol; and (d) 0.01 to 10.0 wt. % of at least one catalyst composition, the at least one epoxy resin, based on the at least one polyisocyanate, being used in such amounts that the molar equivalent ratio of isocyanate groups to epoxide groups is greater than 1.2, preferably between 1.2 and 10, more preferably between 1.25 and 5, even more preferably between 1.3 and 4 and most preferably between 1.4 and 2.

In various embodiments, resin compositions of this kind are adhesive compositions or injection resins. The injection resins are preferably pumpable and in particular suitable for transfer molding (RTM method). In various embodiments, the reaction mixture therefore has a viscosity of <100 mPas at a temperature of 80° C., i.e. a typical infusion temperature. In order to determine the viscosity, the resin mixture is prepared at room temperature using a suitable mixer and the viscosity is determined with increasing temperature at a heating speed of 50 K/min on a plate/plate rheometer in oscillation.

In one embodiment, the invention therefore also relates to the molded articles that can be obtained in the RTM method by means of the resin systems according to the invention. RTM methods in which the described resin systems (polymer compositions) can be used are known per se in the prior art and can be readily adapted by a person skilled in the art such that the reaction mixture according to the invention can be used.

The open times of the resin compositions (reaction mixture), as described herein, are preferably greater than 90 seconds and are preferably in the range of from 2 to 5 minutes, in particular are approximately 3 minutes. "Approximately", as used herein in relation to a numerical value, means the numerical value ±10%.

Depending on the type of epoxides and isocyanates used and depending on the catalyst composition and the use of the cured composition, the reaction mixture in step (2) of the method according to the invention can be cured at different reaction temperatures. The curing temperature can thus be between 10° C. and 230° C. The curing process can generally be carried out at an elevated temperature, i.e. >25° C. The resins are preferably cured between 50° C. and 190° C. and more preferably between 90° C. and 150° C. The duration of the curing process likewise depends on the resins to be cured and on the catalyst composition and can be between 0.01 hours and 10 hours. The curing cycle preferably lasts a few minutes, i.e. in particular 1 to 5 minutes. The curing process can also take place in one or more steps.

During the curing process, the epoxide group-containing resin reacts with the isocyanate in the presence of the catalyst to form at least one oxazolidinone which crosslinks the resins with one another and gives the cured composition inter alia its advantageous physical properties. The at least one oxazolidinone formed during the curing process can be one of 1,2-oxazolidin-3-one, 1,2-oxazolidin-4-one, 1,2-oxazolidin-5-one, 1,3-oxazolidin-2-one, 1,3-oxazolidin-4-one, or 1,3-oxazolidin-5-one. The cured composition can thus also contain a plurality of oxazolidinone isomers that are different from those mentioned above.

The isocyanate groups further react with one another in the presence of the catalyst composition described herein to form at least one isocyanurate which crosslinks the resins with one another and likewise contributes to the advantageous properties of the cured composition.

The resins cured by means of the catalyst systems and method described herein preferably have a critical stress intensity factor K1c of >0.8, preferably at least 1.0, more preferably >1.2 and most preferably >1.5. The glass transition temperature of the cured resins (Tg (tan δ) using DTMA) is, in various embodiments, in the range of more than 100° C., in particular more than 150° C., typically in the range of up to 200° C. The modulus of elasticity of the cured resins is preferably at least 2500 N/mm$^2$, more preferably at least 3000 N/mm$^2$, typically in the range of from 2500 to 5000 N/m$^2$.

Moreover, the present invention relates to the cured composition which can be obtained by the method described herein. Depending on the method, said composition can be present as a molded article, in particular as a fiber-reinforced plastics molded article. Molded articles of this kind are preferably used in automobile manufacture.

The cured polymer composition is thus particularly suitable as a matrix resin for fiber composite materials. These can be used in various methods of application, for example in the resin transfer molding method (RTM) or in the infusion method.

Known high-performance fiber materials are suitable as fiber components of the fiber composite materials. These can consist, for example, of: glass fibers; synthetic fibers, such as polyester fibers, polyethylene fibers, polypropylene fibers, polyamide fibers, polyimide fibers or aramid fibers; carbon fibers; boron fibers; oxide or non-oxide ceramic fibers, such as aluminum oxide/silica fibers, silicon carbide fibers; metal fibers, for example made of steel or aluminum; or of natural fibers, such as flax, hemp or jute. Said fibers can be incorporated in the form of mats, woven fabrics, knitted fabrics, non-woven fabrics, fibrous webs or rovings. Two or more of these fiber materials may also be used as a mixture. Short cut fibers can be selected, but preferably synthetic long fibers are used, in particular woven and non-woven fabrics. Such high strength fibers, non-woven fabrics, woven fabrics and rovings are known to a person skilled in the art.

In particular, the fiber composite material should contain fibers in a proportion by volume of more than 20 vol. %, preferably more than 40 vol. %, particularly preferably between 50 and 70 vol. %, based on the total fiber composite material, in order to achieve particularly good mechanical properties. In the case of carbon fibers, the proportion by volume is determined according to the standard DIN EN 2564:1998-08 and in the case of glass fibers it is determined according to the standard DIN EN ISO 1172:1998-12.

A fiber composite material of this kind is suitable in particular as an automobile part. Compared with steel, such fiber composite components have several advantages, i.e. they are lighter in weight, are characterized by improved crash resistance and are also more durable.

Moreover, it goes without saying that all embodiments that have been disclosed above in connection with the method according to the invention can also be applied in the same manner in the described resin systems and cured compositions, and vice versa.

EXAMPLES

According to the weight specifications in the following tables, Table 1 and Table 2, a diglycidyl ether of bisphenol A (DEGBA; epoxy equivalent of 187 g/mol), a catalyst composition (EMI: 2-ethyl-4-methylimidazole; DBU: diazabicycloundecene) and optionally a polypropylene glycol (Mw 2000 g/mol) were mixed in a speed mixer for 30 s at 2000 rpm in a vacuum. After cooling this mixture to room temperature, a mixture of methylene diphenyl diisocyanate (MDI) and polymers thereof (PMDI), with an NCO equivalent weight of 129 g/mol, was added and likewise mixed using a speed mixer for 30 s at 2000 rpm in a vacuum. The reaction mixture was poured into PTFE molds in order to produce standard-compliant test pieces for determining mechanical data. The resin mixture was first gelled in the mold for 8 min at 100° C. The test pieces were then removed from the mold and post-cured for 30 min at 130° C. and then for 30 min at 180° C. The mechanical characteristics were determined accordingly: stress test according to EN-ISO 527; three-point bending test according to EN-ISO 178; fracture toughness according to IOS 13586; Tg by means of DMTA.

Using the mechanical properties of the tests indicated in Tables 1 and 2, it can be seen that the examples using a polyol and an excess of isocyanate groups of at least 1.2 have a balanced property profile in which the modulus of elasticity, the K1c value and the glass transition temperature are all at the desired level.

TABLE 1

| | NCO/EP | DEGBA | MDI | Polyol | EMI24 | DBU | Modulus of elasticity/MPa | Fmax/MPa | ε-Fmax/% | K1c | TG G" | TG tan d |
|---|---|---|---|---|---|---|---|---|---|---|---|---|
| 1 | 1.20 | 54.0 | 44.8 | | | 1.4 | 2484 | 138.5 | 6.64 | | 158 | 203 |
| 2 | 1.41 | 50.0 | 48.6 | | | 1.4 | 3083 | 136 | 4.34 | 0.66 | 166 | 183 |
| 3 | 1.73 | 45.0 | 53.6 | | | 1.4 | 3268 | 81.2 | 2.39 | 0.58 | 176 | 190 |
| 4 | 2.12 | 40.0 | 58.6 | | | 1.4 | 3315 | 64.6 | 1.87 | 0.58 | 193 | 235 |
| 5 | 1.41 | 49.5 | 48.1 | | 1.0 | 1.4 | 2978 | 74.5 | 2.11 | 0.52 | 162 | 185 |
| 6 | 2.01 | 40.9 | 56.7 | | 1.0 | 1.4 | 3233 | 100.1 | 2.90 | 0.66 | 170 | 201 |
| 7 | 1.20 | 52.5 | 43.6 | 2.5 | | 1.4 | 2814 | 93.1 | 3.19 | 0.84 | 168 | 198 |
| 8 | 1.30 | 50.0 | 44.7 | 3.3 | | 1.3 | 2671 | 56.2 | 1.99 | 0.86 | 172 | |
| 9 | 0.69 | 63.4 | 30.2 | 5.0 | | 1.4 | FOAMS STRONGLY | | | | | 215 |
| 10 | 1.13 | 52.5 | 41.1 | 5.0 | | 1.4 | FOAMS STRONGLY | | | | 162 | 198 |
| 11 | 1.20 | 50.5 | 42.3 | 5.0 | | 1.4 | 2424 | 190.6 | 3.66 | 1.53 | 157 | |
| 12 | 1.41 | 47.5 | 46.1 | 5.0 | | 1.4 | 2532 | 84.1 | 3.66 | 1.1 | 164 | 186 |
| 13 | 1.57 | 45.0 | 48.6 | 5.0 | | 1.4 | 2674 | 75.2 | 2.84 | 0.85 | 172 | 205 |
| 14 | 0.68 | 62.9 | 29.7 | 5.0 | 1.0 | 1.4 | FOAMS STRONGLY | | | | | 189 |
| 15 | 1.00 | 54.9 | 37.8 | 5.0 | 1.0 | 1.4 | FOAMS STRONGLY | | | | | 179 |
| 16 | 1.13 | 52.0 | 40.6 | 5.0 | 1.0 | 1.4 | 2652 | 129.6 | 5.98 | 0.92 | 159 | 177 |
| 17 | 1.20 | 50.5 | 42.3 | 5.0 | 1.0 | 1.4 | 2532 | 103.3 | 4.60 | 1.88 | 157 | 202 |
| 18 | 1.67 | 43.0 | 49.6 | 5.0 | 1.0 | 1.4 | 3043 | 80.6 | 2.56 | 0.82 | 165 | 274 |

TABLE 2

| | NCO/EP | DEGBA | MDI | Polyol | EMI24 | DBU | Modulus of elasticity/MPa | Fmax/MPa | ε-Fmax/% | K1c | TG G" | TG tan d |
|---|---|---|---|---|---|---|---|---|---|---|---|---|
| 19 | 1.00 | 52.5 | 36.1 | 10.0 | | 1.4 | FOAMS STRONGLY | | | | 154 | 168 |
| 20 | 1.20 | 48.0 | 39.8 | 10.0 | | 1.4 | 2152 | 92.1 | 4.50 | 1.58 | 157 | 212 |
| 21 | 1.40 | 45.0 | 43.6 | 10.0 | | 1.4 | 2264 | 73.1 | 3.29 | 1.54 | 162 | 173 |
| 22 | 2.00 | 37.2 | 51.4 | 10.0 | | 1.4 | 2203 | 61.4 | 2.88 | 0.9 | 171 | 202 |
| 23 | 3.00 | 28.5 | 58.9 | 10.0 | 0.9 | 1.2 | 2181 | 73.6 | 3.29 | 0.7 | 172 | 227 |
| 24 | 4.00 | 23.2 | 64.1 | 10.0 | 0.9 | 1.2 | 2309 | 57.4 | 2.38 | 0.7 | 175 | 220 |
| 25 | 1.40 | 44.5 | 43.1 | 10.0 | 1.0 | 1.4 | 2544 | 78.0 | 3.37 | 1.27 | 156 | 176 |
| 26 | 1.51 | 42.8 | 44.7 | 10.0 | 1.0 | 1.4 | 2580 | 93.5 | 3.81 | 1.02 | 161 | 191 |
| 27 | 1.67 | 40.7 | 46.9 | 10.0 | 1.0 | 1.4 | 2672 | 95.9 | 3.68 | 1.03 | 164 | 248 |
| 28 | 1.77 | 39.5 | 48.1 | 10.0 | 1.0 | 1.4 | 2697 | 101.4 | 4.08 | 0.97 | 163 | 146 |
| 29 | 2.00 | 36.8 | 50.8 | 10.0 | 1.0 | 1.4 | 2398 | 104.0 | 4.92 | 0.89 | 165 | 182 |

The invention claimed is:

1. A method for preparing a cured polymer composition which comprises at least one oxazolidinone ring and at least one isocyanurate ring, wherein the method comprises the steps of:
   (1) providing a liquid reaction mixture comprising, based on the total weight thereof:
      (a) 30 to 50 wt. % of at least one liquid, aromatic epoxy resin;
      (b) 35 to 70 wt. % of at least one liquid, aromatic polyisocyanate;
      (c) 4 to 20.0 wt. % of at least one polyol; and
      (d) 0.01 to 10.0 wt. % of a catalyst wherein all of the catalyst in the reaction mixture consist of 1-methylimidazole, 2,4-ethylmethylimidazole (EMI), 4-dimethylaminopyridine, 1,4-diazabicyclo[2.2.2]octane (DABCO), 1,8-diazabicyclo[5.4.0]undec-7-ene (DBU), 1,5-diazabicyclo[3.4.0]non-5-ene (DBN) and mixtures thereof,
      wherein the at least one epoxy resin, based on the at least one polyisocyanate, is used in such amounts that the molar equivalent ratio of isocyanate groups to epoxide groups is between 1.4 and 10; and
   (2) curing the reaction mixture in order to obtain a cured polymer composition which comprises at least one oxazolidinone ring and at least one isocyanurate ring.

2. The method according to claim 1, wherein the at least one epoxy resin is a glycidyl ether.

3. The method according to claim 1, wherein the at least one epoxy resin is a bisphenol diglycidyl ether.

4. The method according to claim 1, wherein the at least one polyisocyanate is a methylene diphenyl diisocyanate (MDI).

5. The method according to claim 1, wherein the at least one polyol is selected from the group consisting of polyether polyol, polyester polyol and mixtures thereof.

6. The method according to claim 1, wherein the at least one polyol is selected from the group consisting of polyethylene glycol, polypropylene glycol, polytetramethylene glycol, polyhexamethylene glycol and mixtures thereof.

7. The method according to claim 1, wherein:
   (a) the reaction mixture is free of epoxy curing agents which enter into a polyaddition reaction;
   (b) the reaction mixture has a viscosity of <100 mPas at a temperature of 80° C.;
   (c) the cured polymer composition has a modulus of elasticity of more than 2500 N/mm$^2$; and/or
   (d) the cured polymer composition has a glass transition temperature of more than 100.

8. The method according to claim 1, wherein:
   (a) the reaction mixture in step (2) is cured at a temperature of between 10° C. and 230° C. for 0.01 to 10 hours; or
   (b) the reaction mixture in step (2) is first cured at a temperature of between 50° C. and 130° C. for 0.1 hours to 3 hours and then at a temperature of between 110° C. and 190° C. for 0.1 hours to 3 hours.

9. The method according to claim 1, wherein the method is a transfer molding (RTM) method and the reaction mixture is a reactive injection resin.

10. The method according to claim 9, wherein step (1) comprises injecting the reactive injection resin into a die in which fibers or semi-finished fiber products are disposed.

11. The cured polymer composition of claim 1.

12. A resin composition, wherein the resin composition comprises, based on the total weight thereof:
   (a) 45.0 to 82.5 wt. % of at least one liquid, aromatic epoxy resin;
   (b) 35 to 60 wt. % of at least one liquid, aromatic polyisocyanate;
   (c) 1.0 to 20.0 wt. % of at least one polyol; and
   (d) 0.01 to 10.0 wt. % of at least one catalyst;
   wherein the at one epoxy resin, based on the at least one polyisocyanate, being used in such amounts that the molar equivalent ratio of isocyanate groups to epoxide groups is greater than 1.2.

13. Cured reaction products of the polymer composition according to claim 12.

14. A fiber-reinforced molded article comprising cured reaction products of the polymer composition according to claim 12.

15. The resin composition according to claim 12, wherein all of the catalyst is a tertiary amine of formula (I) $NR_1R_2R_3$ and/or an imine of formula (II) $N(=R_4)R_5$,
   $R_1$ to $R_3$ and $R_5$ are each independently selected from the group consisting of substituted or unsubstituted, linear or branched alkyl having 1 to 20 carbon atoms, substituted or unsubstituted, linear or branched alkenyl having 3 to 20 carbon atoms and substituted or unsubstituted aryl having 5 to 20 carbon atoms, or at least two of $R_1$ to $R_3$ form, together with the nitrogen atom to which they are bonded, a 5- to 10-membered heteroalicyclic ring or heteroaryl ring, which optionally contains one or more additional nitrogen atoms,
   $R_4$ is a substituted or unsubstituted, linear or branched alkylenyl having 3 to 20 carbon atoms, or $R_4$ and $R_5$ form, together with the nitrogen atom to which they are bonded, a 5- to 10-membered heteroalicyclic ring or heteroaryl ring, which optionally contains additional nitrogen atoms.

16. The resin composition according to claim 15, wherein $R_4$ and $R_5$ form, together with the nitrogen atom to which they are bonded, a 5- to 10-membered heteroalicyclic ring or heteroaryl ring, which optionally contains additional nitrogen atoms.

17. The resin composition according to claim 12, further comprising (e) one or more of solvent, a modified resin, toughener, filler, softener, reactive diluent, nonreactive diluent, coupling agent, adhesion promoter, wetting agent, release agents flame retardant, thixotropic agent, rheological auxiliary, ageing inhibitor, corrosion inhibitor, stabilizer and dye.

18. The resin composition according to claim 12, wherein all of the catalyst in the resin composition consists of a mixture of 2,4-ethylmethylimidazole (EMI) and 1,8-diazabicyclo[5.4.0]undec-7-ene (DBU).

* * * * *